Feb. 19, 1952 D. T. LEWIS 2,586,356
ROW MARKER CONTROL APPARATUS
Filed Jan. 14, 1949 2 SHEETS—SHEET 1
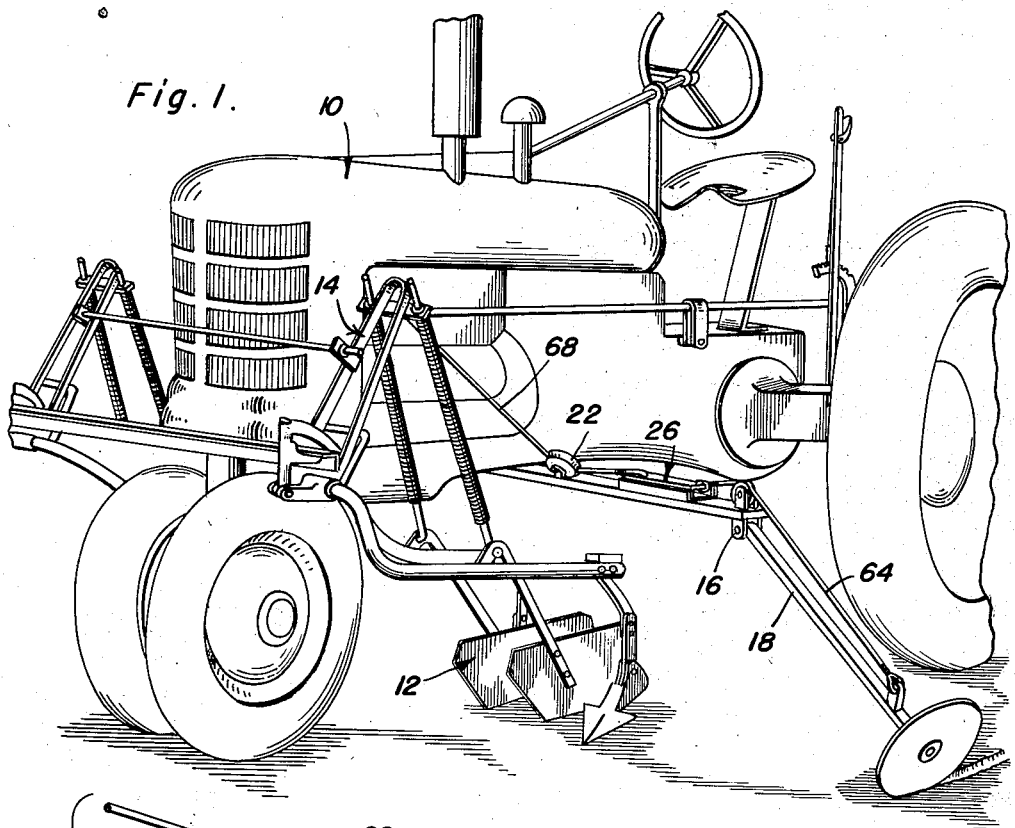
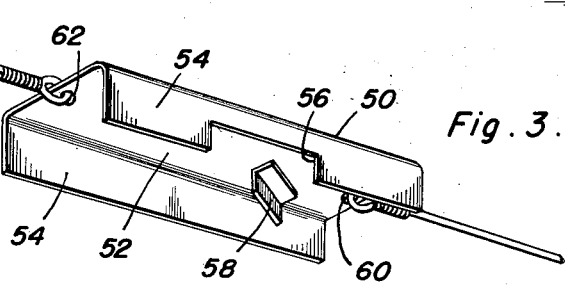
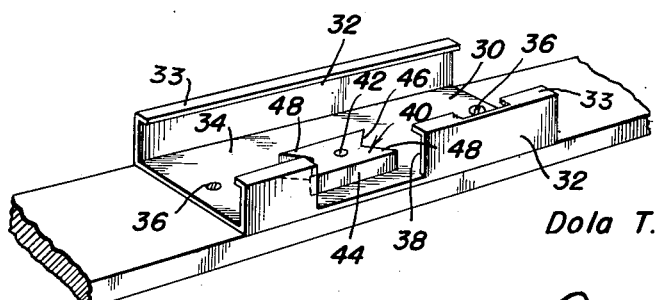
Dola T. Lewis
INVENTOR.

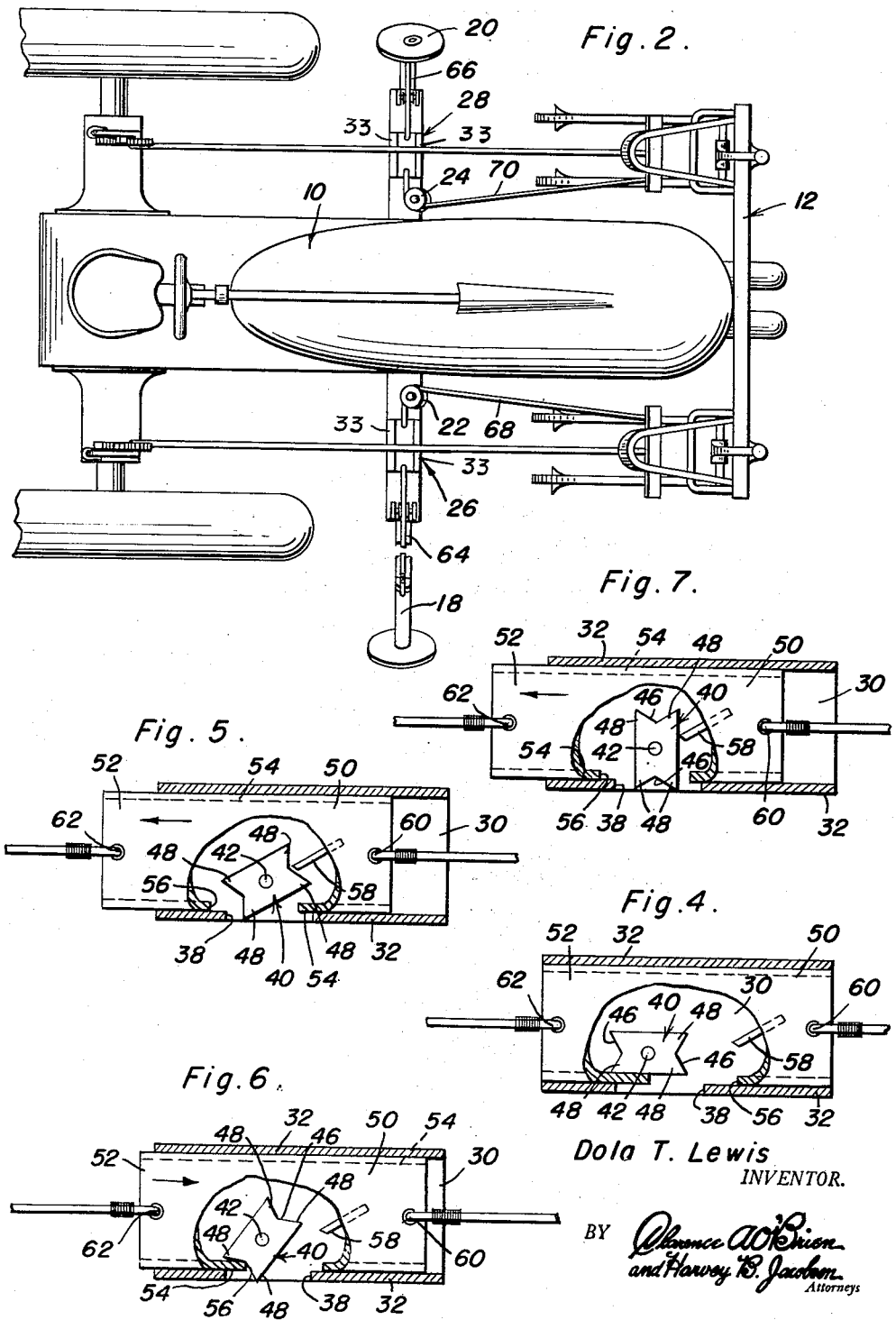

Patented Feb. 19, 1952

2,586,356

UNITED STATES PATENT OFFICE 2,586,356

ROW MARKER CONTROL APPARATUS

Dola T. Lewis, Beaufort, N. C.

Application January 14, 1949, Serial No. 70,862

3 Claims. (Cl. 97—230)

This invention relates to apparatus for governing the movements of a pair of row markers carried by a farm tractor and has for its primary object alternately to raise and lower opposite row markers each time that the farming implement carried by the tractor is elevated clear of the ground.

Another object is to provide a self-contained attachment capable of being applied to a conventional farm tractor equipped with cultivating implement elevating means and row markers coupled to said implement to be moved to a vertical position each time the implement is elevated.

A further object is to automatically arrest lowering movement of a row marker so that each time a turn is made at the end of a soil tilling operation, one row marker will be held in a substantially vertical inoperative position while the other will fall into operative position to serve as a guide in tilling the next row.

Other features include a guide for the slide member and lugs on opposite ends of the keeper for engaging the slide member and holding it against movement in a direction to lower its respective row marker.

In the drawings:

Figure 1 is a fragmentary perspective view of a farm tractor equipped with a conventional soil tilling instrument and the conventional row markers;

Figure 2 is a top plan view of the tractor illustrated in Figure 1 and equipped with this improved row marker control mechanism;

Figure 3 is an exploded view of a row marker control device embodying the features of this invention;

Figure 4 is a top view partially in section of a row marker control device embodying the features of this invention and showing the keeper in its starting position;

Figure 5 is a view similar to Figure 4 showing the slide member moved, and the keeper rotated by the movement of the slide member to bring one of its lugs into the path of movement of the slide member;

Figure 6 is a view similar to Figure 5 illustrating the manner in which the keeper arrests movement of the slide member and serves to hold the slide member against movement in one direction;

Figure 7 is a view similar to Figures 4, 5 and 6 showing the keeper moved to a position preparatory to being returned to its initial position and allowing its respective row marker to swing downwardly into operative position.

Referring to the drawings in detail, a farm tractor designated generally 10 is equipped with a conventional tilling implement 12 which is supported on a conventional lift designated generally 14 of any suitable type. Pivotally supported as at 16 on one side of the farm tractor is a row marker 18, and a similar row marker 20 is pivotally supported in a similar manner on the opposite side of the tractor 10. Under ordinary circumstances the row markers 18 and 20 are coupled to the implement 12 through the means of flexible cables operating over suitable guide pulleys 22 and 24 which, in turn, are coupled to the implement so that as the implement is raised or lowered, the row markers 18 and 20 will be moved through vertical arcs about their respective pivots. The equipment so far described is of conventional form, and forms no part of this invention.

Mounted on the tractor 10 adjacent the row markers 18 and 20 are row marker control members 26 and 28, respectively, each of which comprises a guide channel member 30 provided along opposite marginal edges with upstanding sides 32 joined by a web portion 34 through which attaching screws 36 are extended into a portion of the tractor rigidly to secure the guide member 30 in place. The upper free edges of the sides 32 include inwardly extending flanges 33 which lie parallel to the web portion 34 and one of the sides 32 is provided intermediate its ends with a recess 38 which opens outwardly through its free edge and accommodates opposite ends of an elongated keeper designated generally 40 which is pivotally supported as at 42 on the web 34 of the channel member 30. The keeper 40 comprises an elongated body 44 provided at opposite ends with notches 46 to form outwardly extending lugs 48, the purpose of which will be more fully hereinafter explained.

Mounted for longitudinal sliding movement in the guide member 30 is a slide member 50 which comprises an elongated substantially rectangular body 52 provided with side flanges 54 which are adapted to fit between the sides 32 of the guide member 30 beneath the flanges 33 in order that the slide member 50 will slide freely longitudinally of the guide member. Formed in one of the flanges 54 and opening through the free edge thereof is an elongated longitudinally extending rectangular opening or recess 56 which as illustrated in Figures 5 through 7, inclusive, cooperates with the recess 38 in the guide member in forming an opening through which the ends of the keeper 40 may pass. Extending inwardly from the body 52 of the slide member 50 is a keeper actuating finger 58 which as shown in Figures 5 through 7, inclusive, inclines relative to the longitudinal axis of the slide member 50 so that when pull is exerted on the slide member 50 to the left as viewed in Figures 5 through 7, inclusive, the finger 58 moves into contact with a wall of one of the V-shaped notches 46 of the keeper 40, and moves the keeper about its pivot 42 into the position illustrated in Figure 5 so that a lug 48 at the end of the keeper remote from the finger 58 will be moved into substantially the position shown in Figure 5. Hence as the slide member 50 starts on its return movement, the lug 48 at the end of the keeper remote from that engaged by the finger 58 will move into the path of movement of the flange 54 of the slide member 50 having the slot 56 therein. In this position the lug 48 will arrest return movement of the slide member 50 as will be readily understood upon reference to Figure 6. Upon again moving the slide member 50 to the left, the finger 58 will engage the side of the keeper 40 as illustrated in Figure 7, so that when the slide member 50 again moves to the right when viewed in Figures 4, 5, 6 and 7, the slide member will cause the keeper 40 to rotate into its original starting position as illustrated in Figure 4.

The slide member 50 is provided adjacent the end carrying the finger 58 with an opening 60 for coupling to a cable leading to its respective row marker, and a similar opening 62 is formed in the opposite end of the slide member 50 for the reception of a cable which is coupled to the farm implement 12, so that each time the farm implement is elevated, pull will be exerted on the slide member 50 to cause it to move its respective row marker into elevated position.

With the slide member 50 of the holding device 26 coupled by means of a cable 64 to the row marker 18, and the opening 60 of the slide member of the holding device 28 coupled by means of a cable 66 to the row marker 20, and the openings 62 of the respective holding members 26 and 28 coupled by cables 68 and 70 to the farm implement, it will be evident that as the farm implement 12 is elevated pull will be exerted on the cables 68 and 70 and transmitted through the slide members of the respective holding members 26 and 28 to the cables 64 and 66 so as to elevate their respective row markers 18 and 20. With the keepers 40 of the respective holding devices 26 and 28 so timed that as the respective fingers 58 are moved into contact with the keepers, one of the keepers is turned into the position illustrated in Figure 5 and the other is turned into the position illustrated in Figure 7, it will be obvious that when the implement 12 returns to its lowered position, one row marker will be held in substantially vertical inoperative position, while the other will be permitted to fall downwardly into the position shown in Figure 1 to serve as a guide as the tractor advances. Obviously, with the keepers 40 arranged as previously described, when the implement 12 is again elevated, the row marker which was formerly held in elevated position will now drop to operative position while the opposite row marker will be held in elevated and inoperative position.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. Apparatus for governing the movements of a row marker of the type which is mounted on a farm tractor to move into a substantially vertical inoperative position each time a farm implement carried by the tractor is elevated, said apparatus comprising a slide member coupled to the row marker and to the farming implement to move in unison with the row marker, a guide member mounted on the tractor slidably receiving said slide member, a keeper rotatably mounted in said guide member, means on the slide member to engage successively portions of the keeper and index it to successive positions about its axis of rotation, and means on the keeper projecting into the path of movement of the slide member as the keeper is indexed to hold the slide member against movement in a direction to lower the row marker.

2. Apparatus for governing the movements of a row marker of the type which is mounted on a farm tractor to move into a substantially vertical inoperative position each time a farming implement carried by the tractor is elevated, said apparatus comprising a channel guide member having a web, side members and inwardly extending flanges on the free edges of said side members and mounted on the farm tractor, a slide member mounted to move in a rectilinear path in said guide member and coupled to the row marker and to the farming implement to move in said path in unison with the row marker, a keeper mounted on the web of and disposed within the guide member to rotate about an axis which lies perpendicular to the rectilinear path, means on the slide member to engage successively portions of the keeper and index it to successive positions about its axis of rotation, and means on the keeper projecting into the path of movement of the slide member as the keeper is indexed to hold the slide member against movement in a direction to lower the row marker.

3. Apparatus for governing the movements of a row marker of the type which is mounted on a farm tractor to move into a substantially vertical inoperative position each time a farming implement carried by the tractor is elevated, said apparatus comprising a channel guide member secured to the tractor, said guide member including a web, side members and inwardly extending flanges carried at the free edges of said side members, an inverted U-shaped slide mounted to move in a rectilinear path in said guide member, cables coupling the opposite ends of the web portion of said slide member to the row marker and to the farming implement, a keeper mounted on the web of and within said guide member to rotate about an axis which lies perpendicular to the rectilinear path, a lug secured to the web portion of and disposed within said slide member to engage successively portions of said keeper and index said keeper to successive positions about its axis of rotation, and means on said keeper projecting into the path of movement of said slide member as said keeper is indexed to hold said slide member against movement in a direction to lower the row marker.

DOLA T. LEWIS.

REFERENCES CITED

The following references are of record in the file of this patent:

UNITED STATES PATENTS

| Number | Name | Date |
|---|---|---|
| 765,296 | Perkins | July 19, 1904 |
| 2,341,146 | Kriegbaum et al. | Feb. 8, 1944 |
| 2,376,464 | White | May 22, 1945 |